United States Patent [19]

Emry

[11] Patent Number: 5,436,835
[45] Date of Patent: Jul. 25, 1995

[54] MOTOR VEHICLE COLLISION AVOIDANCE METHOD AND MEANS

[76] Inventor: Lewis D. Emry, 1301 Spring St., #12 E, Seattle, Wash. 98104

[21] Appl. No.: 205,644

[22] Filed: Mar. 4, 1994

[51] Int. Cl.⁶ .............................................. B60T 8/32
[52] U.S. Cl. ............................. 364/426.01; 364/461; 340/995
[58] Field of Search ................ 364/460, 461, 426.01, 364/426.02, 426.03, 426.04; 180/169, 197; 340/903, 995

[56] References Cited

U.S. PATENT DOCUMENTS

| | | | |
|---|---|---|---|
| 4,853,856 | 8/1989 | Hanway | 364/424.01 |
| 4,994,971 | 2/1991 | Poelstra | 364/424.04 |
| 5,065,320 | 11/1991 | Hayashi et al. | 364/424.01 |
| 5,122,961 | 6/1992 | Toyama et al. | 364/449 |
| 5,189,617 | 2/1993 | Shiraishi | 364/424.05 |
| 5,235,316 | 8/1993 | Qualizza | 340/436 |
| 5,249,157 | 9/1993 | Taylor | 340/903 |
| 5,268,692 | 12/1993 | Grosch et al. | 342/70 |
| 5,278,764 | 1/1994 | Izuka et al. | 364/461 |
| 5,293,163 | 3/1994 | Kakihara et al. | 340/995 |
| 5,314,037 | 5/1994 | Shaw et al. | 180/169 |
| 5,315,295 | 5/1994 | Fujii | 340/936 |

*Primary Examiner*—Kevin J. Teska
*Assistant Examiner*—Susan Wieland
*Attorney, Agent, or Firm*—David L. Baker; Rhodes & Ascolillo

[57] ABSTRACT

In a preferred embodiment, a method of determining a safe stopping distance for a motor vehicle, including: storing into computing apparatus weighting factors corresponding to a range of vehicle parameters and driving conditions; entering into the computing apparatus actual vehicle parameters and driving conditions and a desired travel speed; and the computing apparatus calculating and indicating a suggested safe stopping distance from the weighting factors, the actual driving conditions, and the desired travel speed.

6 Claims, 8 Drawing Sheets

FIG. 8

WEIGHTED VALUE COMPARISON MATRIX

| | | VEHICLE TYPE | | | BRAKE SETUP | | TIRE SETUP | | |
|---|---|---|---|---|---|---|---|---|---|
| | | PASS | L TRUCK | MPV | STD | ABS | STD | CHAINS | SNOW |
| | | 1.0 | 1.X | 1.Y | 1.0 | 1.Z | 1.0 | 1.A | 1.B |
| ROAD SURFACE | ASPH/CONCRETE | 1.0 | | | | | | | |
| | GRAVEL/DIRT | | | | | | | | |
| SURFACE CONDITIONS | WET | | | | | | | | |
| | DRY | 1.0 | | | | | | | |
| | SNOW/ICE | | | | | | | | |
| ROAD TYPE | DIVIDED HWY | 1.0 | | | | | | | |
| | 2 LANE HWY | | | | | | | | |
| | CITY/RURAL | 1.0 | | | | | | | |
| TRAFFIC CONDITIONS | LIGHT | | | | | | | | |
| | NORMAL | 1.0 | | | | | | | |
| | HEAVY | | | | | | | | |
| DRIVING CONDITIONS | DAY | 1.0 | | | | | | | |
| | NIGHT | | | | | | | | |
| | CLEAR | 1.0 | | | | | | | |
| | RAIN | | | | | | | | |
| | SNOW/ICE | | | | | | | | |
| | FOG | | | | | | | | |

FIG. 10

| WEIGHTED COMPARISON STOPPING DISTANCE (RISK FACTORED) | MILES PER HOUR | | | | | | | | | | | | | | | | | | |
|---|---|---|---|---|---|---|---|---|---|---|---|---|---|---|---|---|---|---|
| | 10 | 15 | 20 | 25 | 30 | 35 | 40 | 45 | 50 | 55 | 60 | 80 | 95 | 100 |
| 1.00* | 8 | 16 | 26 | 40 | 57* | 74* | 96* | 121* | 150* | 181* | 216* | 405* | 607* | 673* |
| 1.25 | 10 | 20 | 33 | 50 | 71 | 93 | 120 | 151 | 188 | 226 | 270 | 506 | 759 | 841 |
| 1.50 | 12 | 24 | 39 | 60 | 86 | 111 | 144 | 182 | 225 | 272 | 324 | 608 | 911 | 1010 |
| 1.75 | 14 | 28 | 46 | 70 | 100 | 130 | 168 | 212 | 263 | 317 | 378 | 709 | 1062 | 1178 |
| 2.00 | 16 | 32 | 52 | 80 | 114 | 148 | 192 | 242 | 300 | 362 | 432 | 810 | 1214 | 1346 |
| 2.25 | 18 | 36 | 59 | 90 | 128 | 167 | 216 | 272 | 338 | 407 | 486 | 911 | 1365 | 1514 |
| 2.50 | 20 | 40 | 65 | 100 | 143 | 185 | 240 | 303 | 375 | 453 | 540 | 1013 | 1518 | 1683 |
| 2.75 | 22 | 44 | 72 | 110 | 157 | 204 | 264 | 333 | 413 | 498 | 594 | 1114 | 1669 | 1851 |
| 3.00 | 24 | 48 | 78 | 120 | 171 | 222 | 288 | 363 | 450 | 543 | 648 | 1215 | 1821 | 2019 |
| 3.25 | 26 | 52 | 85 | 130 | 185 | 241 | 312 | 393 | 488 | 588 | 702 | 1316 | 1973 | 2187 |
| 3.50 | 28 | 56 | 91 | 140 | 200 | 259 | 336 | 424 | 525 | 634 | 756 | 1418 | 2125 | 2356 |
| 3.75 | 30 | 60 | 98 | 150 | 214 | 278 | 360 | 454 | 563 | 679 | 810 | 1518 | 2276 | 2524 |
| 4.00 | 32 | 64 | 104 | 160 | 228 | 296 | 384 | 484 | 600 | 724 | 864 | 1620 | 2428 | 2692 |
| 6.00 | 48 | 96 | 156 | 240 | 342 | 444 | 576 | 726 | 900 | – | – | – | – | – |

DISPLAY → "ALARM" READJUST SPEED

* Based on passenger vehicle stopping distances table
Per Fed. Standard §105-3, part 571

MOTOR VEHICLE COLLISION AVOIDANCE METHOD AND MEANS

BACKGROUND OF THE INVENTION

1. Field of the Invention

The present invention relates to motor vehicles generally and, more particularly, but not by way of limitation, to a novel method and apparatus for avoiding collisions.

2. Background Art

Rear end collisions resulting from one vehicle following another vehicle too closely ("tailgating") are a frequent cause of accidents the world over. In the United States alone, the social impact of such occurrences in terms of accidental death, injury, medical expense, property damage, and resultant insurance costs is enormous. Yet, even in today's high technology environment, the driving public is conditioned to operating vehicles in a reactive mode. Advances in safety equipment for motor vehicles are mainly reactive in nature. Seat belts, air bags, roll bars, etc., are all designed to protect people from injury when a collision occurs. Such equipment, though excellent for the protection of life and from serious injury, do nothing to prevent rear end accidents. There is a clear need for proactive vehicle safety equipment designed to avoid this type of collision.

As a rule of thumb, it is sometimes recommended that a motor vehicle operator maintain a distance between his motor vehicle and the vehicle immediately in front calculated as one vehicle length for each 10 miles per hour of the vehicle's speed. While this may be a useful general guide, it fails to formally take into account many relevant factors such as road condition, weather, visibility, general traffic conditions, type of vehicle, etc.

There have been a number of attempts to provide systems which calculate vehicle parameters:

U.S. Pat. No. 4,853,856, issued Aug. 1, 1989, to Hanway, describes a vehicle motion logger which includes a microprocessor attached to a motion sensor. The microprocessor calculates and stores such data as maximum speed since last stop, distance, date, and duration of maximum speed and stops, etc.

U.S. Pat. No. 4,994,971, issued Feb. 19, 1991, to Polestra, describes a road inventory system which includes a plurality of video cameras mounted on a vehicle. The video images are recorded together with vehicle motion information for later viewing and use.

U.S. Pat. No. 5,065,320, issued Nov. 12, 1991, to Hayashi et al., describes a control and display system for battery operated forklift trucks to accumulate data for maintenance administration, the data including operating hours and distance travelled.

U.S. Pat. No. 5,122,961, issued Jun. 16, 1992, to Toyama et al., describes a navigation system for a vehicle which displays vehicle location on a map. Inputs to the system include odometer reading and photographic, audio, and steering angle information.

U.S. Pat. No. 5,189,617, issued Feb. 23, 1993, to Shiraishi, describes an integrated motor vehicle control system which integrates the control functions for vehicle engine, automatic transmission, traction, and suspension.

None of the above systems provides information for motor vehicle collision avoidance.

Accordingly, it is a principal object of the present invention to provide method and apparatus to assist in motor vehicle collision avoidance.

It is a further object of the invention to provide such method and apparatus that is easily and conveniently used.

Other objects of the present invention, as well as particular features, elements, and advantages thereof, will be elucidated in, or be apparent from, the following description and the accompanying drawing figures.

SUMMARY OF THE INVENTION

The present invention achieves the above objects, among others, by providing, in a preferred embodiment, a method of determining a safe stopping distance for a motor vehicle, comprising: storing into computing means weighting factors corresponding to a range of vehicle parameters and driving conditions; entering into said computing means actual vehicle parameters and driving conditions and a desired travel speed; and said computing means calculating and indicating a suggested safe stopping distance from said weighting factors, said actual driving conditions, and said desired travel speed.

BRIEF DESCRIPTION OF THE DRAWINGS

Understanding of the present invention and the various aspects thereof will be facilitated by reference to the accompanying drawing figures, submitted for purposes of illustration only and not intended to define the scope of the invention, on which:

FIG. 8 is a matrix that may be used to develop risk factors for programming the calculator/computer.

FIG. 10 is a table giving risk factored stopping distance as a function of vehicle speed.

DESCRIPTION OF THE PREFERRED EMBODIMENTS

Figure 1:
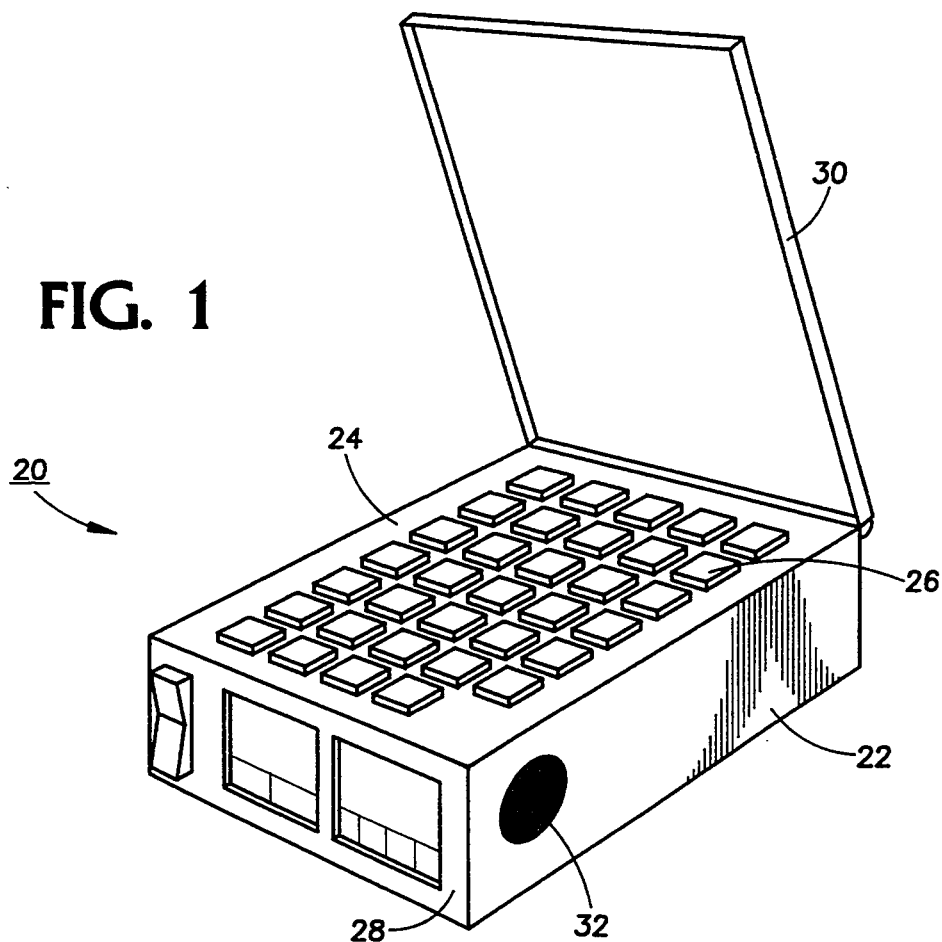
FIG. 1 is a perspective view of a calculator/computer for use in the present invention.

Reference should now be made to the drawing figures, on which similar or identical elements are given consistent identifying numerals throughout the various figures, and on which parenthetical references to figure numbers direct the reader to the view(s) on which the element(s) being described is (are) best seen, although the element(s) may be seen also on other views.

Figure 2:
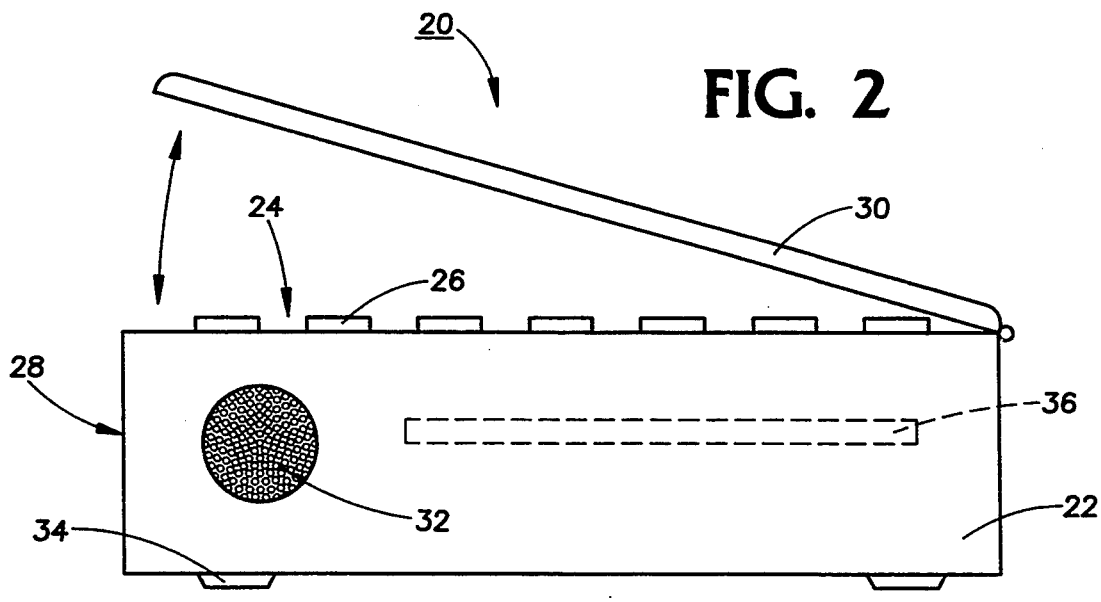
FIG. 2 is a side elevational view of the calculator/computer.

Referring now to FIGS. 1 and 2, there is illustrated a calculator/computer, generally indicated by the reference numeral 20, for use in practicing the present invention. Calculator/computer 20 includes a housing 22, an upper surface 24 with depressible keys extending therethrough, as at 26, a front display surface 28, and a hinged cover 30 to protect keys 26 in a closed position and to permit access to the keys in an open position.

Operational instructions (not shown) may be provided on the inner surface of cover 30. A loudspeaker 32 is provided in the side of housing 22 and resilient feet, as at 34 (FIG. 2), are provided in the lower surface thereof to grip a surface in a vehicle such as a seat or the top of a dashboard (neither shown). Feet 34 can also be made from Velcro or can be suction cups, if desired. Calculator/computer 20 also includes, internally of housing 22, a microprocessor circuit board 36 (FIG. 2).

Figure 3:
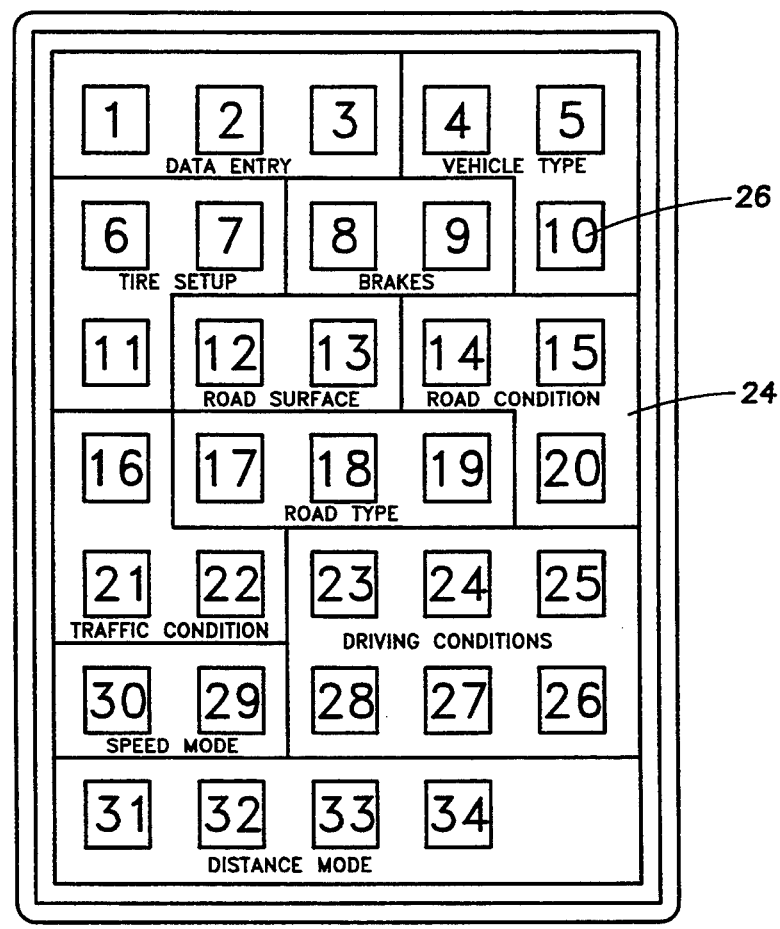
FIG. 3 is a top plan view of the keyboard of the calculator/computer.

FIG. 3 illustrates upper surface 24 of calculator/computer 20 showing the general functions of various groups of keys 26, which functions will be described in detail below.

Figure 4:
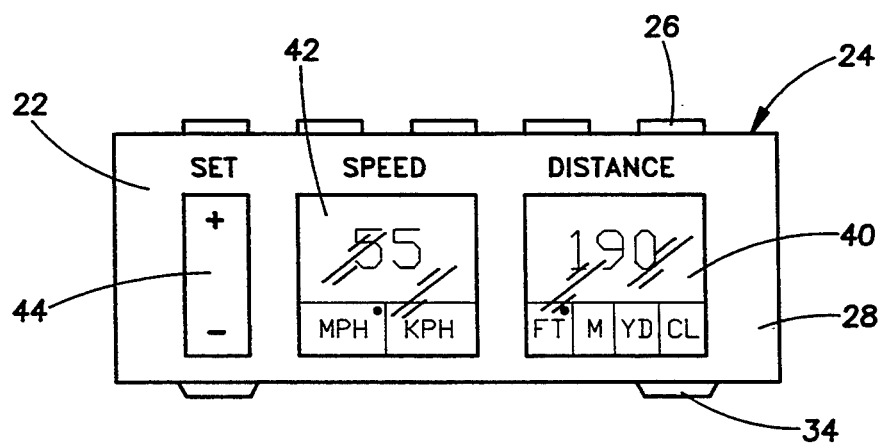
FIG. 4 is a front elevational view of the calculator/computer.

FIG. 4 illustrates, in more detail, front panel 28 in which there is mounted an LED distance readout 40 to give a suggested safe stopping distance, an LED speed readout 42 to give inputted desired travel speed, and a two-position, momentary-contact switch 44 to input the desired travel speed. It can be seen that speed may be selectively indicated in mph or kph and that distance may be selectively indicated in feet, meter, yards, or car lengths.

Figure 5:
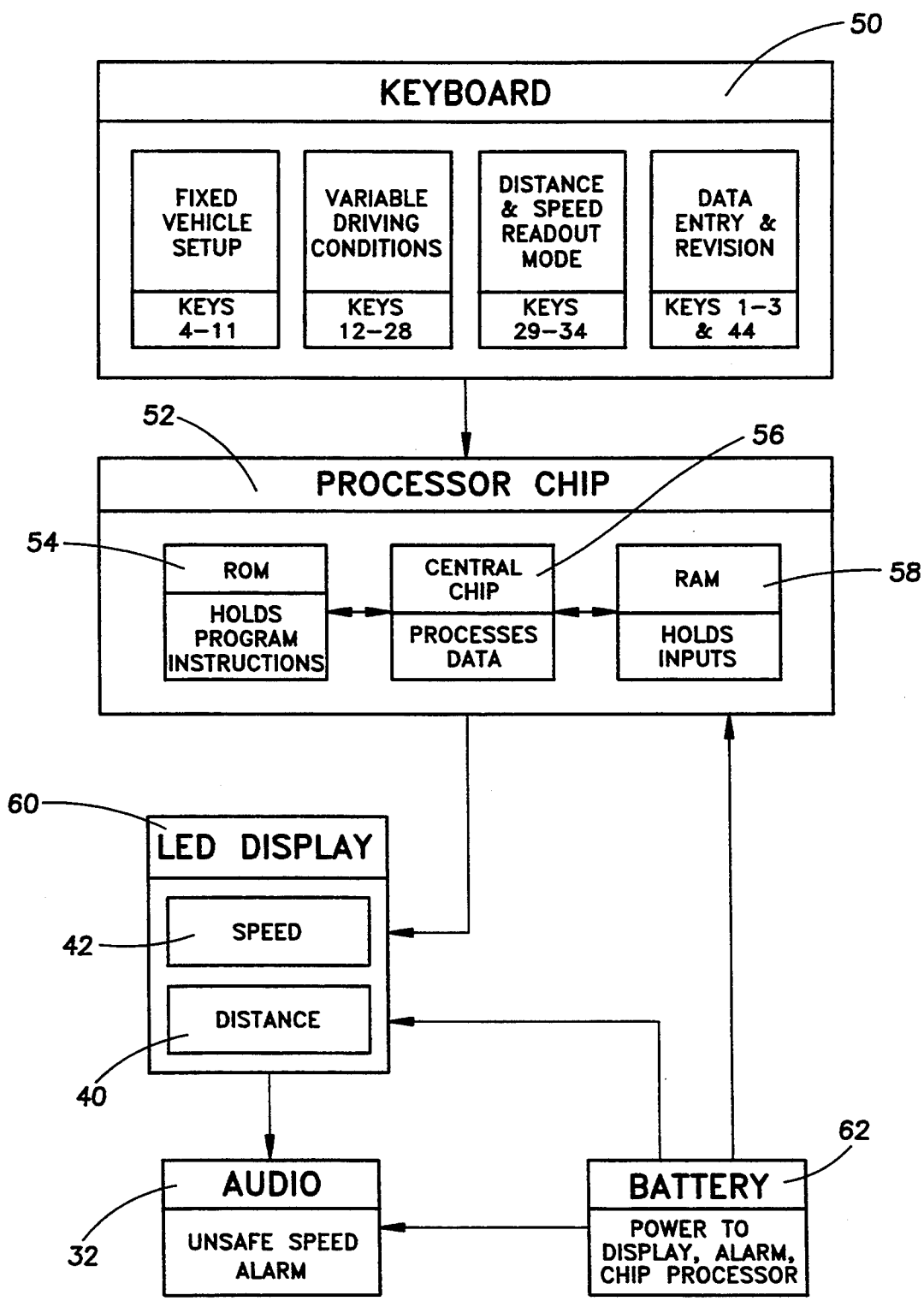
FIG. 5 is a block diagram illustrating the relationships of electrical/electronic components of the calculator/computer.

FIG. 5 illustrates the electrical/electronic components of calculator/computer 20, which include a keyboard 50, containing keys 26 (FIGS. 1-4), connected to a semiconductor processor chip 52. Processor 52 includes a read only memory (ROM) 54 containing program instructions, a central chip 56 for data processing, and a random access memory (RAM) 58 for storing data inputs. Processor 52 is connected to LED display circuitry 60, containing displays 40 and 42 (FIG. 4), the circuitry providing an output signal to loudspeaker 32 if an unsafe speed is inputted. A internal battery 62 is provided to power the components of calculator/computer 20.

Figure 6:
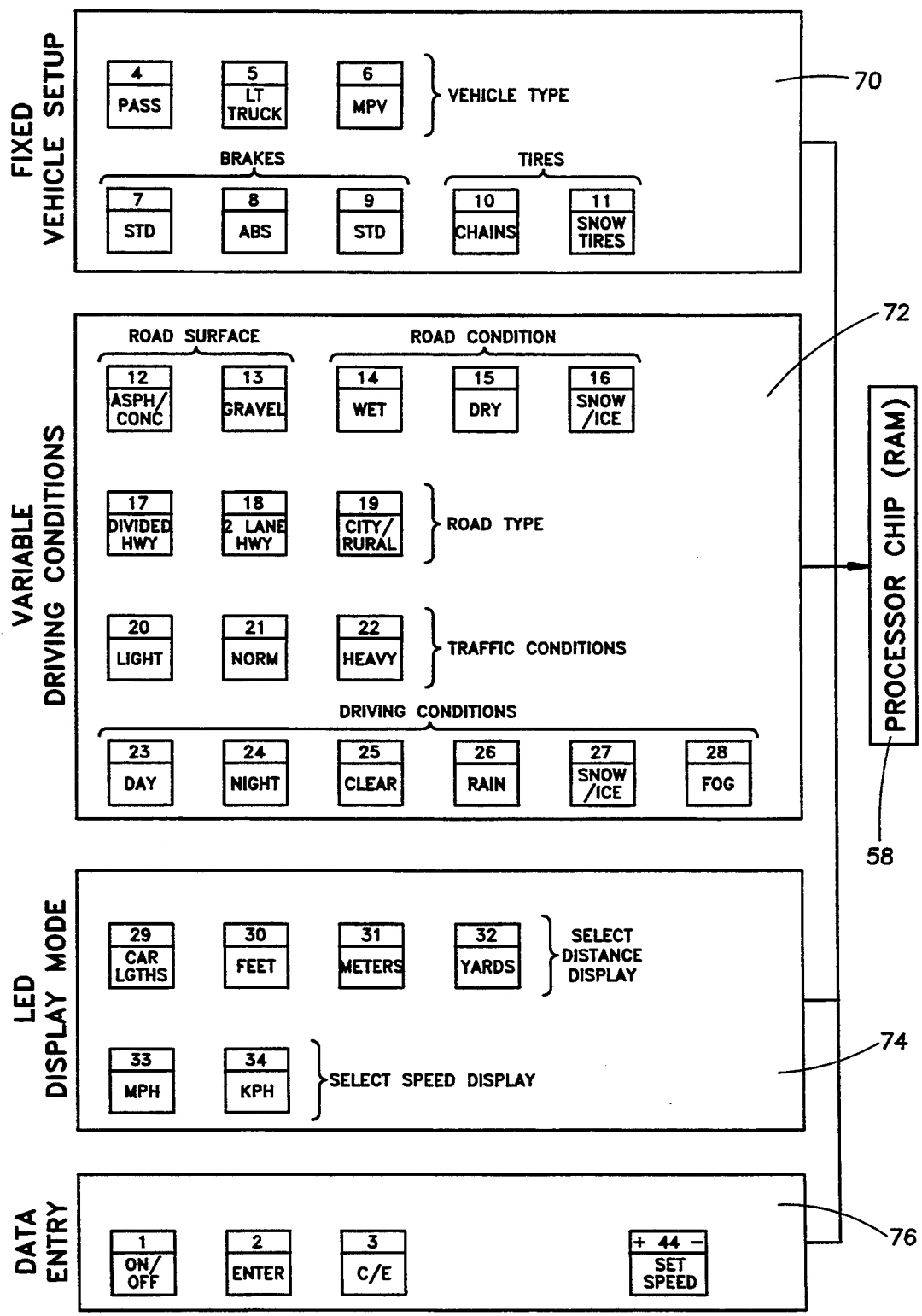
FIG. 6 is a schematic view of the keys of the calculator/computer.

FIG. 6 illustrates the functions of each of the keys in keyboard 50. Block 70, containing keys 4-11, includes parameters related to the vehicle, including vehicle type, types of brakes, and whether the tires have chains or are snow tires. Block 72, containing keys 12-28, includes parameters related to driving conditions, including road surface and condition, road type, traffic conditions, and driving conditions. Block 74, containing keys 29-34, sets the readout units for LED display 60 (FIG. 5). Block 76, containing keys 1-3 and 44, relates to data entry.

Figure 7:
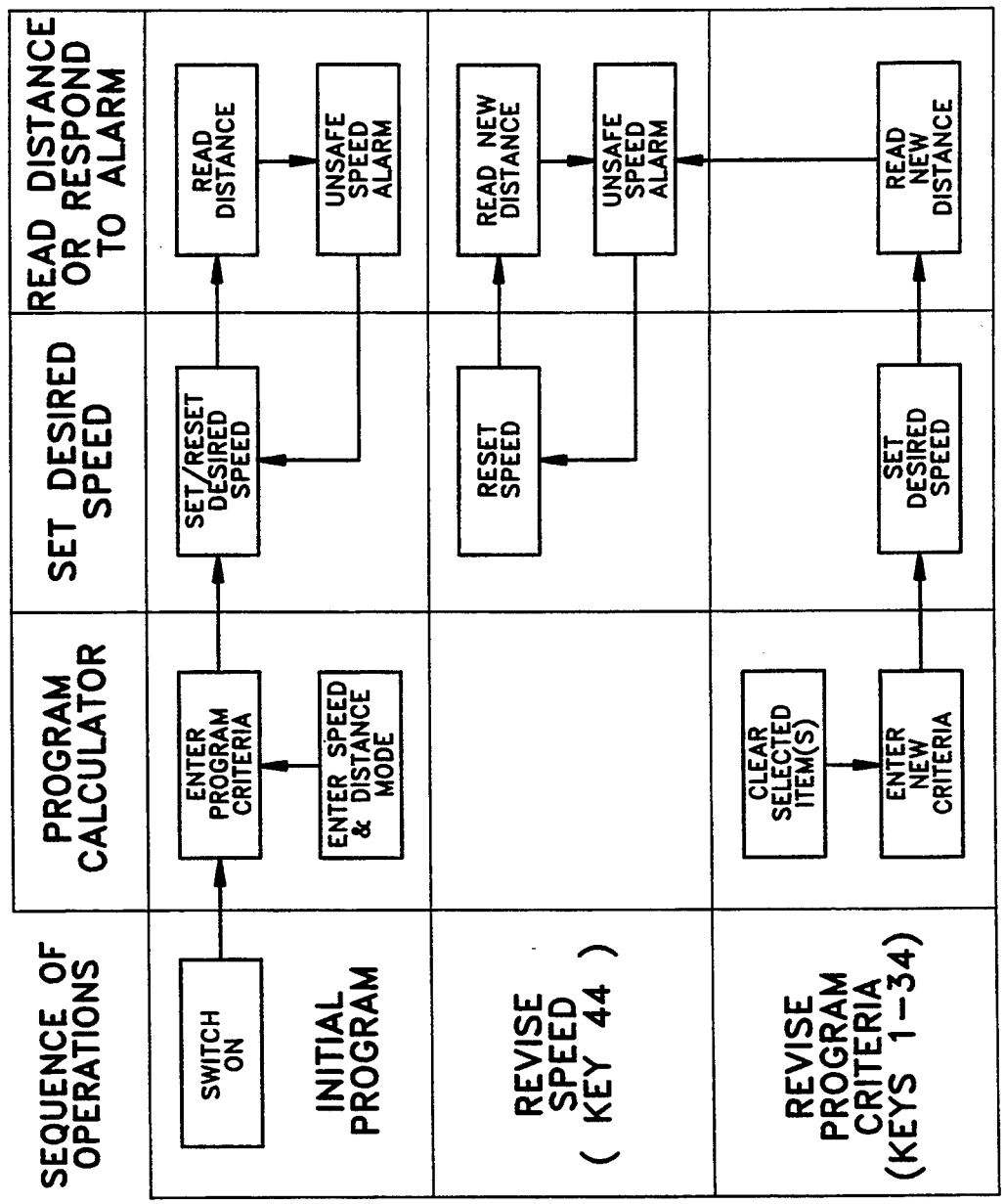
FIG. 7 is a chart illustrating the sequence of data entry to the calculator/computer.

FIG. 7 illustrates the sequence of data entry to calculator/computer 20 prior to a trip taken by a user of the calculator/computer. Initially, calculator/computer 20 is turned on using key #1. (Reference should be made back to FIG. 6 for a complete description of key functions.) Then program criteria are entered, using keys #4-#28, and speed and distance modes are entered, using keys #29-#34, the data being stored in RAM 58 (FIG. 5). Then, desired speed is set, using key #44. Now, if an unsafe driving speed is indicated by loudspeaker 32 (FIG. 6), a new, lower desired speed will be entered. This procedure is reiterated until a safe desired speed has been entered. When parameters change, for example, day becomes night, program criteria are revised, a new desired speed is set, and, if there is an unsafe speed alarm, the speed setting process is reiterated until a safe desired speed has been entered.

FIG. 8 is a weighted value comparison matrix that can be used to compile a data base for entry into ROM 54 of processor 52 (FIG. 5) so that the processor can make the necessary calculations of stopping distance and safe speed as above, with a factor of 1.0 being used as a baseline for stopping distances. In other words, a passenger vehicle traveling on a concrete, divided highway, during the day in normal traffic conditions and clear weather would have a calculated stopping distance of 1.0 times the base stopping distance for the desired travel speed.

Figure 9:
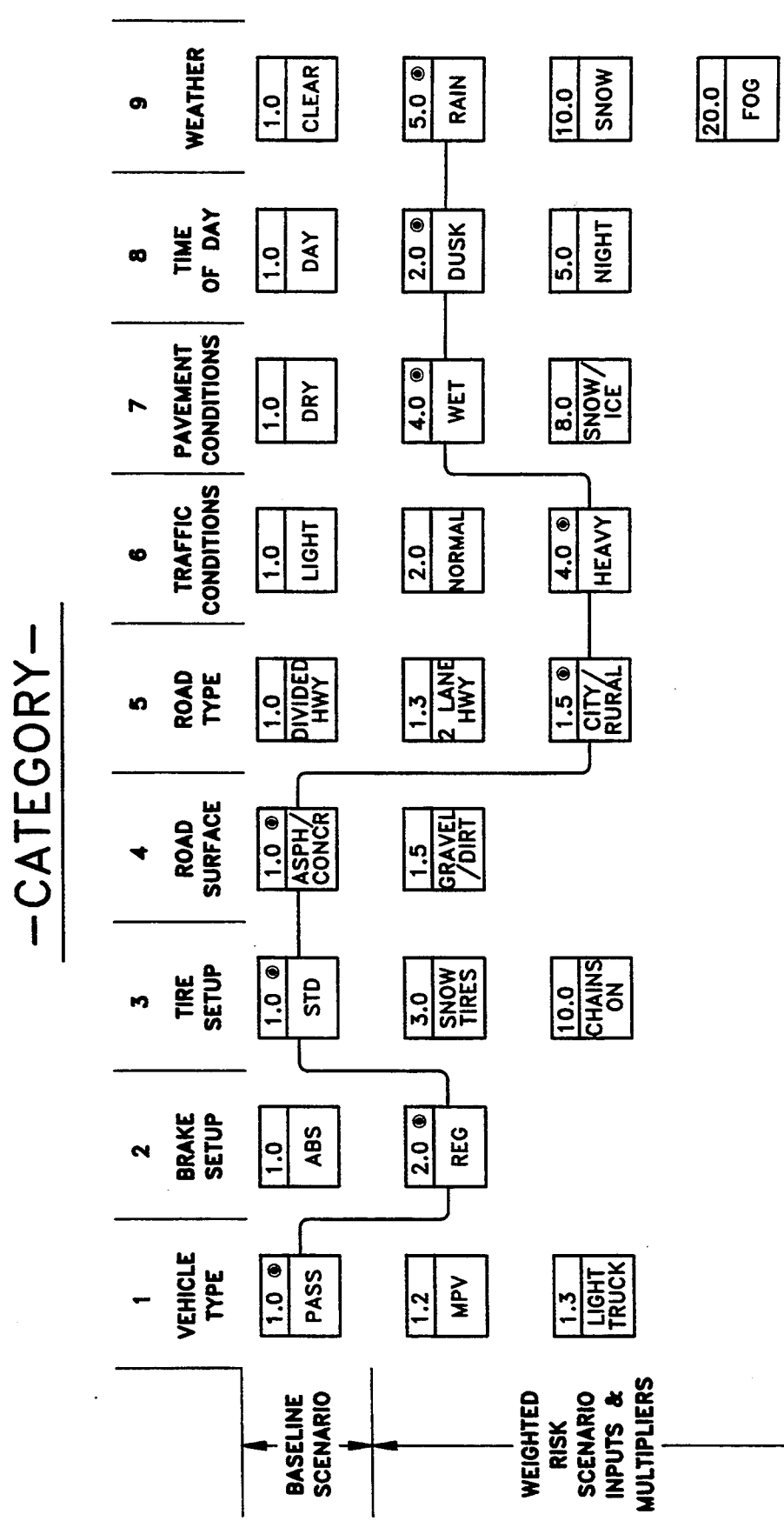
FIG. 9 illustrates risk scenario inputs and multipliers.

FIG. 9 illustrates an example of how the data generated for FIG. 8 would be used to determine a safe stopping distance. Here, a solid line joins factors for various parameters in a driving situation. The total of these nine entries is 21.5. Dividing these number by the number of entries gives a 2.38 risk factor. If the baseline stopping distance for a 40 mph speed is 96 feet, the stopping distance with a risk factor of 2.38 would be (96×2.38=) 229 feet. That is the distance one must keep behind a preceding vehicle under the driving conditions indicated.

FIG. 10 is a table of stopping distance as a function of vehicle speed and weighted risk factor, the figures in the table being based on a Federal standard. The stepped heavy line indicates the point at which an unsafe speed alarm will sound. Generally, this point occurs, for any speed, at an adjusted stopping distance of between 260 and 270 feet.

Calculator/computer 20 may also be installed in a vehicle to receive a direct input of actual vehicle speed and to provide an alarm signal when safe driving speed is exceeded. A distance sensor may also be included in the system to provide an automatic indication of the clear distance and/or an alarm signal indicating that the clear distance is too short.

It can be seen that calculator/computer 20 is quite portable, can be economically constructed using conventional components, and is easy to use.

It will thus be seen that the objects set forth above, among those elucidated in, or made apparent from, the preceding description, are efficiently attained and, since certain changes may be made in the above construction without departing from the scope of the invention, it is intended that all matter contained in the above description or shown on the accompanying drawing figures shall be interpreted as illustrative only and not in a limiting sense.

It is also to be understood that the following claims are intended to cover all of the generic and specific features of the invention herein described and all statements of the scope of the invention which, as a matter of language, might be said to fall therebetween.

I claim:

1. An apparatus for determining a safe stopping distance for a motor vehicle, comprising:
   (a) computing means having stored therein weighting factors corresponding to a range of vehicle parameters and driving conditions; and
   (b) means to enter into said computing means actual vehicle parameters and driving conditions and a desired travel speed for said computing means to calculate and indicate a suggested safe stopping distance from said weighting factors, said actual driving conditions, and said desired travel speed.

2. An apparatus, as defined in claim 1, further comprising means for said computing means to indicate when said desired travel speed is unsafe.

3. An apparatus, as defined in claim 1, wherein said vehicle parameters are selected from the group consisting of: vehicle type, brake type, and tire type.

4. A method, as defined in claim 5, wherein said driving conditions are selected from the group consisting of:

road surface, road type, traffic conditions, pavement conditions, time of day, and weather.

5. A method of determining a safe stopping distance for a motor vehicle, comprising:

(a) storing into computing means weighting factors corresponding to a range of vehicle parameters and driving conditions;

(b) entering into said computing means actual vehicle parameters and driving conditions and a desired travel speed; and said vehicle parameters are selected from the group consisting of: vehicle type, brake type, and tire type;

said driving conditions are selected from the group consisting of: road surface, road type, traffic conditions, pavement conditions, time of day, and weather; and (c) said computing means calculating and indicating a suggested safe stopping distance from said weighting factors, said actual driving conditions, and said desired travel speed.

6. A method, as defined in claim 5, further comprising the step of said computing means providing an indication when said desired travel speed is unsafe.

* * * * *